United States Patent Office 2,826,610
Patented Mar. 11, 1958

2,826,610

MANUFACTURE OF MONOCHLOROACETIC ACID

Elton K. Morris, Midland, Mich., assignor to The Dow Chemical Company, Midland, Mich., a corporation of Delaware No Drawing. Application September 12, 1955
Serial No. 533,899

4 Claims. (Cl. 260—539)

This invention concerns an improved method for the manufacture of monochloroacetic acid.

Monochloroacetic acid has long been manufactured by chlorinating acetic acid in the presence of catalysts and removing, from the monochlorinated product, dichloroacetic acid and other ingredients of the reacted mixture. It is well known that these operations are difficult to accomplish economically in a manner yielding a product of satisfactory purity. The chlorination is usually carried out by passing chlorine into a mixture of glacial acetic acid and acetic anhydride and/or acetyl chloride while heating the mixture under reflux at a reaction temperature, usually of from 100° to 110° C., and venting the gaseous hydrogen chloride which is formed. After completing the reaction, the monochloroacetic acid product is crystallized and then subjected to recrystallization and/or solvent extraction operations to remove impurities, especially dichloroacetic acid, down to a point at which the monochloroacetic acid is of a purity acceptable on the market. The dichloroacetic acid boils at close to the same temperature as monochloroacetic acid and cannot satisfactorily be removed by distillation. It is for this reason that the purification is carried out in the manner just stated. For most purposes, it is necessary that the monochloroacetic acid be purified to a point at which it retains 2 weight percent or less of dichloroacetic acid. The mother liquor and extracts obtained in purifying monochloroacetic acid to this extent usually contain at least three pounds of monochloroacetic acid and unconsumed acetic acid per pound of dichloroacetic acid. The mono- and dichloroacetic acids present in the mother liquor and/or extracts cannot economically be separated from one another and are usually discarded. For these reasons, a small, e. g. a from 1 to 3 weight percent, reduction in the proportion of dichloroacetic acid formed in the chlorination reaction, and present in the chlorinated material, results in a considerable increase in yield of the monochloroacetic acid recoverable as a product of sufficient purity for use or marketing. A reduction in the proportion of dichloroacetic acid, relative to monochloroacetic acid, formed in the chlorination reaction to a value within the limits of purity of monochloroacetic acid required for marketing the latter would avoid need for most, if not all, of the above-mentioned usual purification steps and would be highly desirable if it were attainable without undue increase in the cost of manufacture.

The crude reaction mixtures heretofore produced by passing chlorine into a heated starting mixture of acetic acid and about 5–10 weight percent of acetic anhydride until most, e. g. about 90 percent, of the acetic acid has been monochlorinated have usually contained about 5–7 percent of dichloroacetic acid, based on the combined weight of the same and the monochloroacetic acid. In U. S. Patent 2,539,238 it is taught that the chlorinations of acetic acid containing 5 weight percent or less of acetic anhydride have required temperatures above 110° C. for the reaction to proceed and have resulted in significant quantities of polychloroacetic acids being formed unless the reaction is stopped when only from 30 to 40 percent of the acetic acid has been monochlorinated. The patent teaches that by employing a much larger proportion of acetic anyhydride, i. e. from 25 to 85 percent, based on the combined weight of the same and the acetic acid, the chlorination can be carried out at lower reaction temperatures of from 70° to 110° C. to a point at which about one molecular equivalent or slightly more of chlorine has been introduced per mole of acetic acid, initially present as such and in the form of acetic anhydride, and hydrolyzing the acyl chlorides and any chlorinated acetic anhydride present in the resulting mixture, the formation of dichloroacetic acid can be suppressed and monochloroacetic acid be produced directly in a form of sufficient purity for marketing or use. The patent requires that its chlorination be carried out to the monochloro stage, or using a moderate excess of chlorine, at temperatures in the range of from 70° to 110° C. It warns that temperatures above 110° C. promote formation of polychloroacetic acids. Its alleged advantage of directly producing monochloroacetic acid of acceptable purity is obtained by substituting, in place of part of the acetic acid previously used as a starting material, an increased proportion of the more expensive compound, acetic anhydride, which serves both as a catalyst and a reactant for ultimate formation of the chloroacetic acid.

The present invention is based on research wherein: (a) the prior art teaching, that under otherwise similar conditions for the monochlorination of acetic acid, in the presence of acetic anhydride and/or acetyl chloride as catalyst, the yield of dichloroacetic acid relative to that of monochloroacetic acid decreases with increase in the proportion of catalyst present, was confirmed; (b) contrary to teachings in the art, it was found that at reaction temperatures between 80° and 120° C. or thereabout and when monochlorinating a mixture of acetic acid and a total of between 5 and 15 mole percent of one or more of the usual catalysts, e. g. acetic anhydride, acetyl chloride, chloroacetyl chloride, chloroacetic anhydride and acetic chloroacetic anhydride, etc., the yield of dichloroacetic acid relative to monochloroacetic acid decreases with increase in the reaction temperature under otherwise similar reaction conditions; (c) it was found (1) that when employing a reaction temperature and a proportion of the catalyst within the respective ranges just stated, the yield of dichloroacetic acid relative to that of monochloroacetic acid increases when the chlorine feed rate is increased to an extent reducing to below 25 hours the time for introduction of the stoichiometric amount of chlorine required to monochlorinate the acetate radicals of the starting mixture of acetic acid and the catalyst; (2) that a moderate change in feed rate of the chlorine has little, if any, effect on the relative yields of the mono- and dichlorinated acetic acids when the feed rates are such that more than 25 hours are required to introduce said stoichiometric amount of chlorine; and (3) that these teachings apply regardless of whether the chlorine be fed as a continual stream or in an intermittent manner, provided the time for introduction of the stoichiometric amount of chlorine be considered as the total time during which chlorine is actually being fed to the reaction; (d) it was found that under otherwise similar conditions, the yield of dichloroacetic acid relative to that of monochloroacetic acid becomes greater with increase in the pressure on the reaction mixture, and vice versa; and (e) it was found that as the chlorination progresses the rate at which catalyst is lost, e. g. by formation and/or vaporization of acetyl chloride, at a given condenser temperature and pressure decreases or, stated another way, the temperature can be raised, or the pressure lowered, or both, to a moderate extent without increasing appreciably the rate of loss of catalyst by vaporization from the mixture.

The method of the invention, which is based on the information and discoveries just stated, permits more convenient or economical manufacture of monochloroacetic acid of good quality than has heretofore been possible.

As hereinbefore indicated, the chlorination of acetic acid is conventionally carried out in the presence of one or more other compounds, such as acetic anhydride and acetyl chloride, which other compounds promote the reaction, presumably by becoming chlorinated and subsequently undergoing exchange reactions with the acetic acid so that they serve, in effect, as chlorine carriers. Because they promote the reaction, the other compounds just mentioned often, and hereinafter, are termed "catalysts" even though they may become chlorinated to form compounds such as acetic chloroacetic anhydride, chloroacetyl chloride, or dichloroacetyl chloride that can be hydrolyzed to form further amounts of the chlorinated acetic acid products. When acetic anhydride is fed as a catalyst to the chlorination reaction it is at least partially converted, by reaction with hydrogen chloride, to acetyl chloride which also functions as a catalyst. Such reaction of hydrogen chloride with one molecular weight of acetic anhydride results in formation of one mole of acetic acid and one mole of acetyl chloride, i. e. the reaction involves only small change in the mole percent of catalytically active substances present. Chlorinated derivatives of the catalytic compounds just mentioned are capable of reacting with acetic acid to regenerate the catalytically active compounds and, therefore, also function indirectly as catalysts for the chlorination reaction. For instance, chloroacetyl chloride reacts with acetic acid to form chloroacetic acid and acetyl chloride. These last mentioned changes in the kinds of catalytically active substances present during the chlorination do not involve a change in the molecular proportion of catalyst present. However, the proportion of catalyst tends to decrease during the reaction due to loss of acetyl chloride vapors together with the hydrogen chloride evolved.

In order to avoid any misunderstanding, all catalyst concentrations hereinafter mentioned are mole percent of total catalyst, expressed or calculated as acetyl chloride regardless of which of the above-mentioned catalytically active ingredients is actually present.

According to the invention, chlorine is fed into a mixture of glacial acetic acid and a total of from 4 to 15, preferably from 6 to 12, mole percent (calculated as acetyl chloride) of one or more of the above-mentioned catalysts at a pressure of from 0 to 30, preferably from 0 to 7, p. s. i. g. and at a rate requiring from 25 to 200, preferably from 40 to 70, hours for introduction of the amount of chlorine theoretically required to monochlorinate the acetyl groups of the acetic acid and catalytic starting materials, while heating the mixture at temperatures between 80° and 120° C., advantageously between 90° and 120° C., and preferably between 105° and 115° C., and maintaining the proportion of catalytically active ingredients in the mixture within the limits just stated. Hydrogen chloride gas, formed by the reaction, is periodically or continuously vented. The introduction of chlorine is usually terminated when from 70 to 95, preferably from 88 to 93 percent of the acetic acid, fed to the reaction as such or as acetyl chloride or acetic anhydride, has been monochlorinated. Further chlorination, if carried out, results in a fairly sharp increase in the proportion of dichloroacetic acid formed. Chlorination in the manner and under the conditions just stated results in more efficient or complete utilization of the chlorine than is obtained under other chlorination conditions.

The anhydrides and acid chlorides of acetic acid and chloroacetic acid can be removed from the chlorinated mixture, or be hydrolyzed, in known ways to obtain the chloroacetic acid product in a form free of the same. The product is monochloroacetic acid containing only a small, and often tolerable, proportion of dichloroacetic acid. If necessary, the proportion of dichloroacetic acid in the product can be reduced by the known recrystallization and extraction operations hereinbefore mentioned.

Although the process can, with advantage, be carried out using any combination of the above-described permissible reaction conditions to obtain unusually good yields of marketable monochloroacetic acid, the following procedure is preferred. Chlorine is fed at about atmospheric pressure, e. g. at from 0 to 7 p. s. i. g., to a mixture of acetic acid and from 6 to 12 mole percent of one or more of the aforementioned catalysts at a rate requiring from 40 to 70 hours for monochlorination of the acetyl groups of the organic starting materials while heating the mixture at reaction temperatures of from 90° to 100° C. and venting gaseous hydrogen chloride from the mixture as it is formed. As the reaction is continued to a stage at which most, e. g. 70 percent or more, of the stoichiometric amount of chlorine has been added, further minor amounts of catalyst, preferably acetic anhydride, are added as necessary to maintain from 6 to 12 mole percent of catalyst in the mixture and the temperature is raised to between 105° and 120° C., advantageously between 105° and 115° C. This preferred mode of operation permits the chlorination to be carried out as extensively as desired, e. g. to a point at which from 90 to 95 percent of the acetyl radicals of the organic starting materials have been monochlorinated. The chlorinated mixture can be treated with the amount of water required to hydrolyze the acid anhydrides and/or acid chlorides contained therein. The monochloroacetic acid thus directly obtained is usually of a quality suitable for use or marketing.

The following examples illustrate the invention and certain of its advantages, but are not to be construed as limiting its scope.

EXAMPLE 1

This example illustrates the effect of changes in the proportion of catalyst in the reaction mixture on the relative amounts of monochloroacetic acid and dichloroacetic acid which are formed at various stages in the chlorination reaction. In each of three experiments, chlorine was fed to a mixture of glacial acetic acid and the proportion of catalyst given in the following table. The catalyst concentration is calculated and expressed as mole percent of acetyl chloride. However, the catalyst was initially in the form of acetic anhydride and, in each experiment, further amounts of acetic anhydride were added during the reaction as necessary to maintain the molecular proportion of catalyst substantially constant. The rate of chlorine feed was such as to introduce into each mixture in about 60 hours the stoichiometric amount of chlorine required for monochlorination of the acetic acid introduced to the reaction as such or in the form of acetic anhydride. Each mixture was maintained at 80° C. and at a pressure of 20 p. s. i. g. during the reaction and gaseous hydrogen chloride was vented from the mixture through a relief valve as it was formed. Some acetyl chloride was evolved together with the hydrogen chloride. Aliquot portions of each mixture were withdrawn from time to time and analyzed. The proportions of monochloroacetic acid and dichloroacetic acid present were calculated on a basis of the analysis. In the values thus obtained, chlorinated intermediates, e. g. chloroacetyl chloride, hydrolyzable to form monochloroacetic acid are included in the calculated amount of the latter and dichlorinated intermediates, such as dichloroacetyl chloride, which are hydrolyzable to form dichloroacetic acid are included in the calculated amount of dichloroacetic acid. The amounts of monochloro- and dichloro-acetic acids calculated as having been formed at successive stages of each of the chlorination reactions were plotted and from the resulting graphs the values given in Table I were taken. The table gives the average mole percent of the above-mentioned catalyst present in each mixture during chlorination of the same. It also gives the proportions, expressed as mole percent, of monochloroacetic acid and dichloroacetic acid calculated as present at successive stages in the chlorination of each mixture.

20 p. s. i. g., except that two of the chlorinations were carried out at 80° and 100° C., respectively, while maintaining an average of 5.2 mole percent of the catalyst in the mixture by periodic additions of minor amounts of acetic anhydride to make up for losses; and the other chlorination was carried out at 120° C. while similarly maintaining an average of 6.1 mole percent of catalyst

Table I

| Run No. | Mole percent of catalyst present | Kinds of chloroacetic acids | Mole percent of chloroacetic acids in mixture at successive stages | | | | | | | | |
|---|---|---|---|---|---|---|---|---|---|---|---|
| 1 | 2 | Monochloro- | 10 | 20 | 30 | 40 | 50 | 60 | 70 | 80 | 90 |
|   |   | Dichloro- | 0.26 | 0.66 | 1.16 | 1.71 | 2.32 | 2.97 | 3.62 | 4.26 | 4.91 |
| 2 | 5.2 | Monochloro- | 10 | 20 | 30 | 40 | 50 | 60 | 70 | 80 | 90 |
|   |   | Dichloro- | 0.15 | 0.47 | 0.79 | 1.13 | 1.48 | 1.86 | 2.27 | 2.73 | 3.27 |
| 3 | 14.9 | Monochloro- | 10 | 20 | 30 | 40 | 50 | 60 | 70 | 80 | 90 |
|   |   | Dichloro- | 0.17 | 0.36 | 0.53 | 0.72 | 0.85 | 1.07 | 1.25 | 1.52 | 1.92 |

EXAMPLE 2

This example illustrates the effect of a change in the pressure at which the chlorination is carried out on the relative proportions of monochloroacetic acid and dichloroacetic acid formed. In each of two experiments chlorine was fed under pressure to a mixture of acetic acid and about 6 mole percent of catalyst (initially added as acetic anhydride) while heating the mixture at 80° C., venting the gaseous hydrogen chloride from the mixture through a relief valve as it was formed, and adding further amounts of catalyst to replace minor amounts of the same lost, in the form of acetyl chloride, in the effluent hydrogen chloride vapors. One of the chlorinations was carried out at a pressure of 5 p. s. i. g. and the other at a pressure of 20 p. s. i. g. Except for the details just given, the procedure in carrying out each chlorination, in periodically removing and analyzing samples, and in calculating from the analysis the relative amounts of monochloro- and dichloro-acetic acids in the mixtures at successive stages in the chlorination reactions, were similar to those described in Example 1. Table II indicates the pressure on each mixture during chlorination of the same and gives the proportions, as mole percent, of monochloroacetic acid and dichloroacetic acid calculated as present in the mixtures at each of a number of successive stages in the reaction.

in the mixture. It will be evident from the data in Table I that the differences in concentrations of catalysts in these experiments are such as to cause only small differences in the results obtained, i. e. the differences in results obtained from one experiment to the other are due for the most part to the changes in the reaction temperatures employed. During each chlorination, aliquot portions of the reaction mixture were removed from time to time and analyzed and the relative amounts of mono- and dichloroacetic acids in the reaction mixtures were calculated from the analysis of the weighed samples. The data thus obtained is given in the following table.

Table III

| Run No. | Temp., °C. | Kinds of Chloroacetic Acid | Mole percent of chloroacetic acids in mixture at successive stages | | | | | | | | |
|---|---|---|---|---|---|---|---|---|---|---|---|
| 1 | 80 | Monochloro- | 10 | 20 | 30 | 40 | 50 | 60 | 70 | 80 | 90 |
|   |   | Dichloro- | 0.15 | 0.47 | 0.79 | 1.13 | 1.48 | 1.86 | 2.27 | 2.73 | 3.27 |
| 2 | 100 | Monochloro- | 10 | 20 | 30 | 40 | 50 | 60 | 70 | 80 | 90 |
|   |   | Dichloro- | 0.16 | 0.34 | 0.55 | 0.77 | 1.05 | 1.37 | 1.64 | 1.91 | 2.39 |
| 3 | 120 | Monochloro- | 10 | 20 | 30 | 40 | 50 | 60 | 70 | 80 | 90 |
|   |   | Dichloro- | 0.13 | 0.33 | 0.53 | 0.73 | 0.92 | 1.12 | 1.31 | 1.52 | 2.06 |

EXAMPLE 4

This example illustrates the effect of the rate of chlorine feed on the relative amounts of monochloroacetic acid and dichloroacetic acid formed at successive stages in the chlorination reaction. In each of three experiments, chlorine was fed at atmospheric pressure into a mixture of glacial acetic acid and 6.25 mole percent of catalyst (introduced as acetic anhydride, but calculated and expressed as acetyl chloride) while heating the mixture at 100° C. and venting gaseous hydrogen chloride from the mixture as it was formed. In each experiment, small amounts of catalyst (acetic anhydride) was added as necessary to maintain the catalyst concentration substantially constant, i. e. to replace acetyl chloride formed and lost in the vent gas. In one experiment, the chlorine was fed at a rate corresponding to introduction of the stoichiometric amount of chlorine (theoretically required to monochlorinate all acetyl radicals of the organic feed materials) in approximately 10 hours, in another experiment the feed rate corresponded to introduction of the stoichiometric amount of chlorine in 27 hours, and in the

Table II

| Run No. | Pressure, at p. s. i. g. | Kinds of chloroacetic acids | Mole percent of chloroacetic acid in mixture at reaction stages | | | | | | | | |
|---|---|---|---|---|---|---|---|---|---|---|---|
| 1 | 5 | Monochloro- | 10 | 20 | 30 | 40 | 50 | 60 | 70 | 80 | 90 |
|   |   | Dichloro- | 0.15 | 0.37 | 0.60 | 0.82 | 1.05 | 1.26 | 1.49 | 1.77 | 2.18 |
| 2 | 20 | Monochloro- | 10 | 20 | 30 | 40 | 50 | 60 | 70 | 80 | 90 |
|   |   | Dichloro- | 0.15 | 0.47 | 0.79 | 1.13 | 1.48 | 1.86 | 2.27 | 2.73 | 3.27 |

EXAMPLE 3

This example illustrates the effect of variations in the reaction temperature, over a range of from 80° to 120° C., on the relative proportions of monochloroacetic acid and dichloroacetic acid formed at each of a number of successive stages in the chlorination reaction. The procedure described in Example 1 was applied in carrying out each of three chlorination reactions, all at a pressure of other experiment the chlorine feed rate corresponded to introduction of the stoichiometric amount of chlorine in about 72 hours. Otherwise, the chlorinations were carried out in similar manners. In each experiment, aliquot portions of the mixture were periodically withdrawn and analyzed, the respective amounts of monochloroacetic acid and dichloroacetic acid present in the mixture at each time of sampling were calculated, as in Example 1, and the calculated values were plotted. The following table identifies the respective experiments by giving the chlorine feed rates in terms of time for introduction of the stoichiometric amount of chlorine. It gives values, taken from the graph which was plotted, for the amounts of monochloroacetic acid and dichloroacetic acid calculated as present in each mixture at several successive stages in each chlorination reaction.

*Table IV*

| Run No. | Time, Hrs. | Kinds of Chloroacetic Acids | Mole percent of chloroacetic acids in mixture at sucessive stages | | |
|---|---|---|---|---|---|
| 1 | 10 | Monochloro- | 85 | 90 | 94.5 |
|   |    | Dichloro-    | 2.08 | 2.30 | 2.64 |
| 2 | 27 | Monochloro- | 85 | 90 | 94.5 |
|   |    | Dichloro-    | 1.74 | 1.94 | 2.16 |
| 3 | 72 | Monochloro- | 85 | 90 | 94.5 |
|   |    | Dichloro-    | 1.58 | 1.76 | 2.00 |

I claim:

1. A method for the production of monochloroacetic acid which comprises feeding chlorine into a liquid mixture of acetic acid and a total of from 4 to 15 mole percent (calculated as acetyl chloride) of at least one catalyst selected from the group consisting of acetic anhydride, acetyl chloride and chlorinated derivatives thereof, while heating the mixture at a pressure of from 0 to 30 pounds per square inch, gauge, to reaction temperatures between 80° and 120° C., venting gaseous hydrogen chloride from the mixture as it is formed, and introducing further amounts of at least one of the above-named catalysts to maintain the catalyst concentration within the above-stated limits, the chlorine being fed to the mixture at a rate requiring from 25 to 200 hours for introduction of the stoichiometric amount of chlorine theoretically required for monochlorination of all of the acetyl groups of the above-stated organic feed materials and the chlorination being terminated when from 70 to 95 percent of the acetyl groups of the above-mentioned organic ingredients of the mixture have been monochlorinated.

2. A method, as claimed in claim 1, wherein the chlorination is carried out at pressures in the range of from 0 to 7 pounds per square inch, gauge, and the temperature is raised from a value of between 90° and 100° C. to a value of between 105° and 120° C. as the chlorination progresses.

3. A method, as claimed in claim 1, wherein the catalyst in the chlorination mixture is maintained at from 6 to 12 mole percent concentration during the reaction.

4. A method, as claimed in claim 1, wherein the catalyst in the reaction is maintained at from 6 to 12 mole percent concentration by adding further amounts of catalyst during the reaction, the chlorination is carried out at pressures of from 0 to 7 pounds per square inch, gauge, the temperature is raised from a value between 90° and 100° C. to a value between 105° and 115° C. as the chlorination progresses, and the chlorination is terminated when from 90 to 95 percent of the acetyl groups of the organic ingredients of the mixture have been monochlorinated.

References Cited in the file of this patent

UNITED STATES PATENTS

| 2,503,334 | Hammond et al. | Apr. 11, 1950 |
| 2,539,238 | Eaker | Jan. 23, 1951 |